United States Patent [19]

Kliemt et al.

[11] Patent Number: 4,564,884
[45] Date of Patent: Jan. 14, 1986

[54] ELECTRICAL APPARATUS WITH BASE PLATE

[75] Inventors: Wilfried Kliemt, Amberg; Manfred Krones, Freihung, both of Fed. Rep. of Germany

[73] Assignee: Siemens Aktiengesellschaft, Munich, Fed. Rep. of Germany

[21] Appl. No.: 503,799

[22] Filed: Jun. 13, 1983

[30] Foreign Application Priority Data

Jun. 24, 1982 [DE] Fed. Rep. of Germany ... 8218134[U]

[51] Int. Cl.[4] .............................................. H02B 1/04
[52] U.S. Cl. ..................... 361/353; 361/393; 200/51 R; 200/296
[58] Field of Search .......... 339/17 LM, 17 M, 198 N; 335/160; 361/331, 340, 346–348, 350, 353, 376, 412, 417, 419, 420, 429, 426, 359, 393, 415, 428; 200/51 R, 50 C, 296; 248/27

[56] References Cited

U.S. PATENT DOCUMENTS

| 2,929,965 | 3/1960 | Oden ................................. 361/393 |
| 2,940,016 | 6/1960 | Flint ................................. 361/393 |
| 3,496,421 | 2/1970 | Greenwall, Jr. .................... 361/353 |
| 4,251,851 | 2/1981 | Diersing ............................ 361/353 |

FOREIGN PATENT DOCUMENTS 1117200 11/1961 Fed. Rep. of Germany .
292560 8/1953 Switzerland .

OTHER PUBLICATIONS

Siemens NS1 Brochure "Verzeichnis der Kataloge und Betriebsanleitungen," Apr. 1982, pp. 1/13, 1/16, 1/17.
Siemens Brochure "Sicherungs–Motortrenner" or "Switch Fuses".

Primary Examiner—G. P. Tolin
Attorney, Agent, or Firm—Kenyon & Kenyon

[57] ABSTRACT

An electrical device of the type which is mounted on a base plate is formed of a plurality of individual components which are mounted on only one portion of a divided base plate. In one embodiment, the electrical device is a multipolar switch and the individual components are plate-shaped elements. The divided base plate is provided with at least first and second base plate portions which are separable from one another along a division which extends transverse to the major planes of the base-shaped elements. The plate-shaped elements are coupled to the first base plate portion, and the second base plate portion is advantageously replaceable in a simple manner such that electrical connections to the electrical device can be configured illustratively as screw-receiving connections, or connector connections. The interchange between various types of second base plate portions can be achieved without disassembly of the electrical device.

4 Claims, 7 Drawing Figures

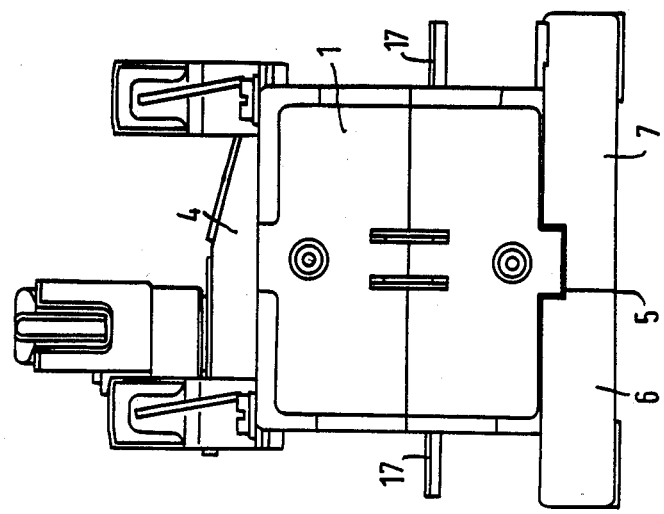
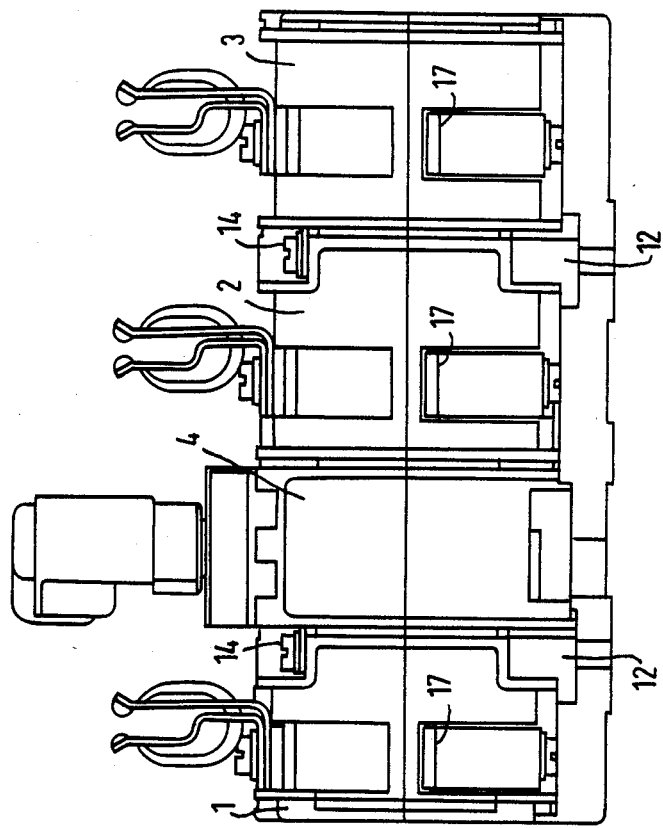

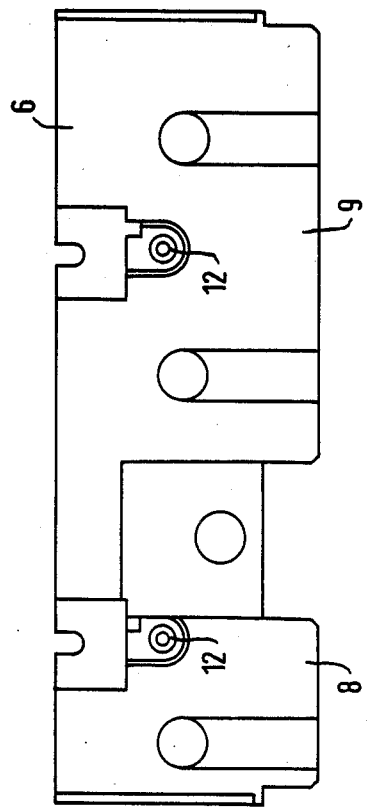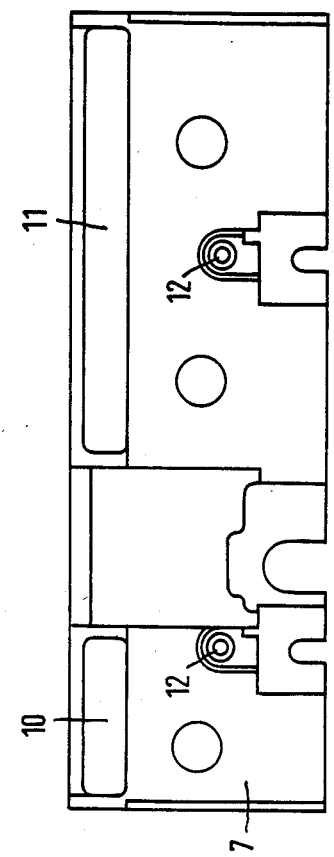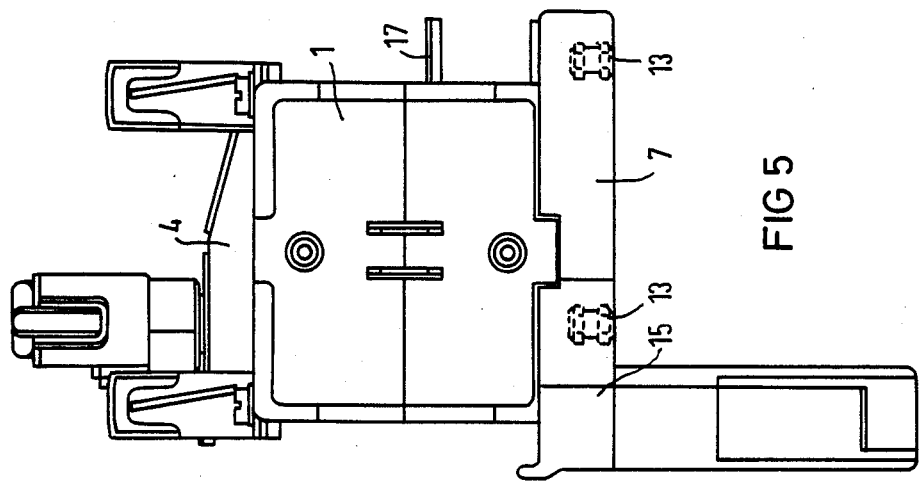

ELECTRICAL APPARATUS WITH BASE PLATE

BACKGROUND OF THE INVENTION

This invention relates generally to electrical devices, and more particularly, to an electrical device which is formed of an arrangement of individual component parts which are secured to a base plate.

In known arrangements of the type wherein an electrical device formed of a plurality of components is installed on a base plate, the individual components are fastened to the base plate, and are then covered by a housing which is subsequently secured to the base plate.

SUMMARY OF THE INVENTION

In accordance with the invention, an electrical device which is formed of a plurality of component parts which are secured to a base plate, is provided wherein the base plate is divided into portions on which are secured individual components of the electrical device on respective portions of the divided base plate.

In a preferred embodiment of the invention, access may be had to the electrical device from its underside without requiring the entire device to be disassembled. Such access may be achieved by simply removing a portion of the base plate, while the components of the electrical device remain secured to another portion of the base plate.

In one embodiment of the invention wherein the electrical device is a multipolar switch, the electrical device is advantageously formed of a plurality of individual switching devices, each having a substantially plate-like configuration, and secured to a portion of the base plate. In such an arrangement, the base plate is divided transversely to the major planes of the individual plate-like switching devices. Thus, an individual base plate portion can be removed without causing disintegration of the arrangement or separation of the plate-like switching devices from one another.

In order to prevent arcing from the individual devices to the base plate, the individual base plate portions may advantageously be interlocked with one another. It may also be advantageous if one base plate portion can be replaced by a connector plate, thereby permitting the type of connection which is utilized for the electrical device to be changed without difficulty and without requiring disassembly of the device. In order that the arrangement be connectable in a simple manner to connectors which are fastened to a mounting plate, it may be further advantageous if the connector plate is bent or angled. Thus, a tight assembly of the individual switching devices can be achieved, particularly if the individual base plate portions are provided with pins for ensuring precise placement of the individual devices thereon.

BRIEF DESCRIPTION OF THE DRAWINGS

Comprehension of the invention is facilitated by reading the following detailed description in conjunction with the annexed drawings, in which:

FIGS. 1, 2, and 3 are front, side, and plan views, respectively, of an electrical switching device embodiments of the invention having a divided base plate;

FIGS. 4 and 5 are front and side views, respectively, of an embodiment of the invention wherein a portion of the base plate is replaced by another base plate portion in the form of an angled connector plate; and FIGS. 6 and 7 are plan views of different constructions of the base plate portions utilized in the embodiment of FIGS. 1 and 2, showing the manner in which the base plate portions couple with one another.

DETAILED DESCRIPTION

Figure 3:
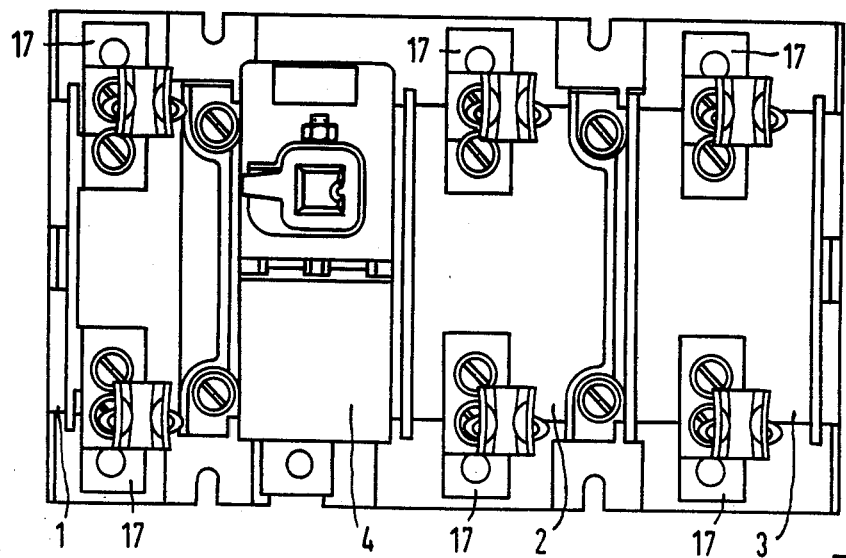

FIGS. 1-4 show a multipolar switching device having individual switching device components 1, 2, and 3, which are configured as substantially thick plate-like devices. In addition, a switch locking or latching device 4 is arranged intermediate of individual switching devices 1 and 2. A division 5 between base plate portions 6 and 7 of the base plate of the multipolar switching device is arranged transverse to the major planes of the base-like switching devices.

FIGS. 6 and 7 show two base plate portions 6 and 7 separated from one another. Base plate portion 6 is provided with projections 8 and 9 which, when base plate portion 6 is engaged with base plate portion 7, project into recesses 10 and 11 of base plate portion 7. Thus, base plate portions 6 and 7 overlap one another in the regions of projections 8 and 9 and recesses 10 and 11. However, no such overlapping of base plate portions 6 and 7 is necessary in the region beneath switch locking device 4 because arcing cannot occur between switch locking device 4 and the surface to which the switch locking device is secured, when in use.

Base plate portions 6 and 7, as shown in FIGS. 6 and 7, are arranged to engage with corresponding recesses in component switching devices 1 and 2. In addition, a plurality of nuts 13 are provided to cooperate with a corresponding number of long screws 14 which, in combination, secure the component switching devices to the base plate portions. In one embodiment, such nuts may be of the pressed-in type.

Figure 4:
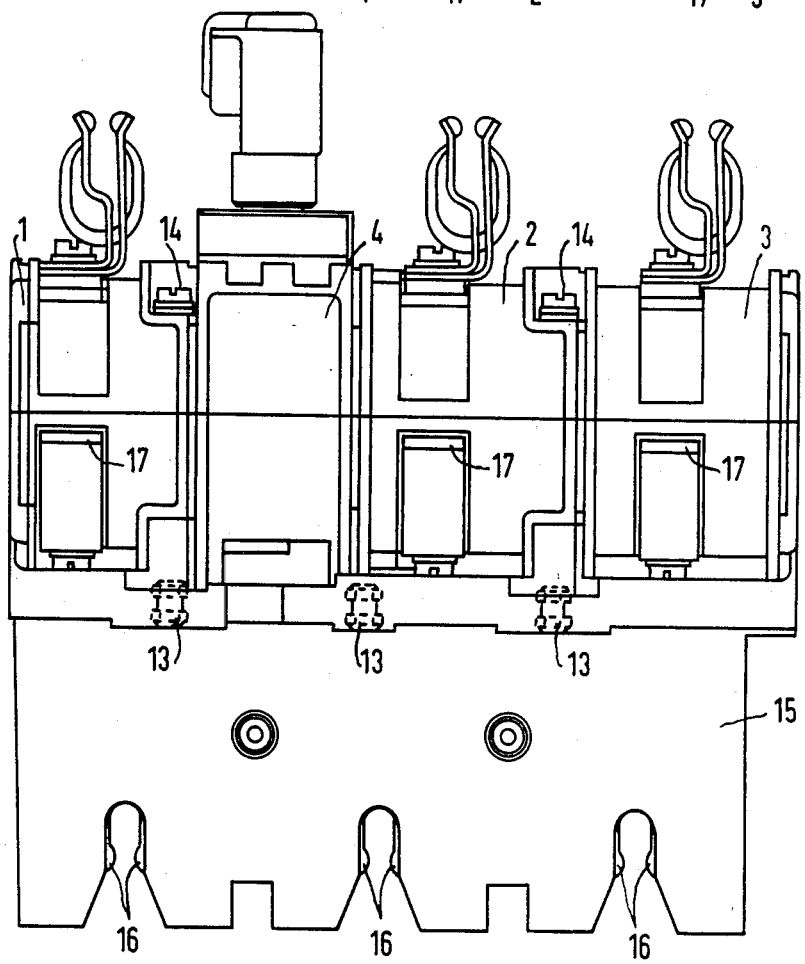

FIGS. 4 and 5 illustrate an alternative base plate portion to base plate portion 6, described hereinabove. More specifically, base plate portion 6 can be replaced by, for example, an angled connector plate 15. Angled connector plate 15 is provided with electrical sockets 16, instead of screw-receiving connections. The electrical sockets are connected in an electrically conductive manner to the contacts in individual switching devices 1, 2, and 3. In embodiment of the invention wherein connector plate 15 is an angled socket plate, the socket plate can be arranged on a matching plug board (not shown) which is secured to an assembly plate (not shown) during installation of the device as a whole.

It is a particular advantage of the present invention that the hereinabove described arrangement permits conversion of the electrical device from a type having a screw-receiving connection, to a type having a plug-receiving connection, in a simple manner without requiring disassembly of the entire device. Base plate portion 7 can be retained, for example, if screw-receiving connections are desired on the opposite side of the device.

Although the invention has been described in terms of specific embodiments and applications, persons skilled in the art, in light of this teaching, can generate additional embodiments without exceeding the scope or departing from the spirit of the claimed invention. Accordingly, it is to be understood that the drawings and descriptions in this disclosure are preferred to facilitate comprehension of the invention and should not be construed to limit the scope thereof.

What is claimed is:

1. An electrical device of the type formed of a plurality of individual substantially plate-shaped multipolar switching components which are secured to a base plate, the base plate comprising at least first and second base plate portions disposed in a common first plane extending substantially perpendicularly to said multipolar switching components, said multipolar switching components being secured to only said first base plate portion, said base plate portions being separably joined to one another along a second plane extending perpendicularly to said multipolar switching components and said first plane, one of said base plate portions being provided with a plurality of integral projections disposed in said first plane, the other of said base plate portions being provided with a plurality of recesses, said projections extending into said recesses in an assembled state of said base plate portions, said second base plate portion taking the form of an electrical socket plate including an extension arranged at an angle with respect to said first base plate portion, said extension being provided with a plurality of socket formations along an edge parallel to and spaced from said first plane.

2. The electrical device of claim 1 wherein said second base plate portion is provided with electrical connector portions.

3. An electrical device of the type formed of a plurality of individual substantially plate-shaped multipolar switching components which are secured to a base plate, the base plate comprising at least first and second base plate portions disposed in a common first plane extending substantially perpendicularly to said multipolar switching components, said multipolar switching components being secured to only said first base plate portion, said base plate portions being separably joined to one another along a second plane extending perpendicularly to said multipolar switching components and said first plane, further comprising means for preventing arcing from said multipolar switching components to said base plate portions, said means for preventing including on one of said base place portions a plurality of integral projections disposed in said first plane, the other of said base plate portions being provided with a plurality of recesses, said projections extending into said recesses in an assembled state of said base plate portions.

4. An electrical assembly comprising:
a plurality of individual substantially plate-shaped multipolar switching components;
a first base plate portion disposed in a first plane, said multipolar switching components being secured to said first base plate portion and defining respective second planes extending parallel to one another and perpendicularly to said first plane;
a substantially plate-shaped second base plate portion separably joinable to said first base plate portion along a third plane extending perpendicularly to said first plane and said second planes, said first base plate portion and said second base plate portion being commonly disposed in said first plane upon a joining of said first base plate portion and said second base plate portion; and
a cross-sectionally L-shaped third base plate portion separably joinable to said first base plate portion along said third plane, said third base plate portion including an extension arranged at an angle with respect to said first base plate portion in an assembled state of said first base plate portion and said third base plate portion, said extension being provided with a plurality of socket formations along an edge parallel to and spaced from said first plane in an assembled state of said first base plate portion and said third base plate portion, said third base plate portion being interchangeable with said second base portion, said base plate portions being provided with a plurality of integral projections and with a plurality of recesses matable therewith, said projections extending into said recesses in said first plane in an assembled state of said first base plate portion with either one of said second base plate portion and said third base plate portion.

* * * * *